Sept. 11, 1934.　　　　M. WEBER　　　　1,972,962
CONSTANT LEVEL APPARATUS
Filed May 8, 1933　　　2 Sheets-Sheet 1
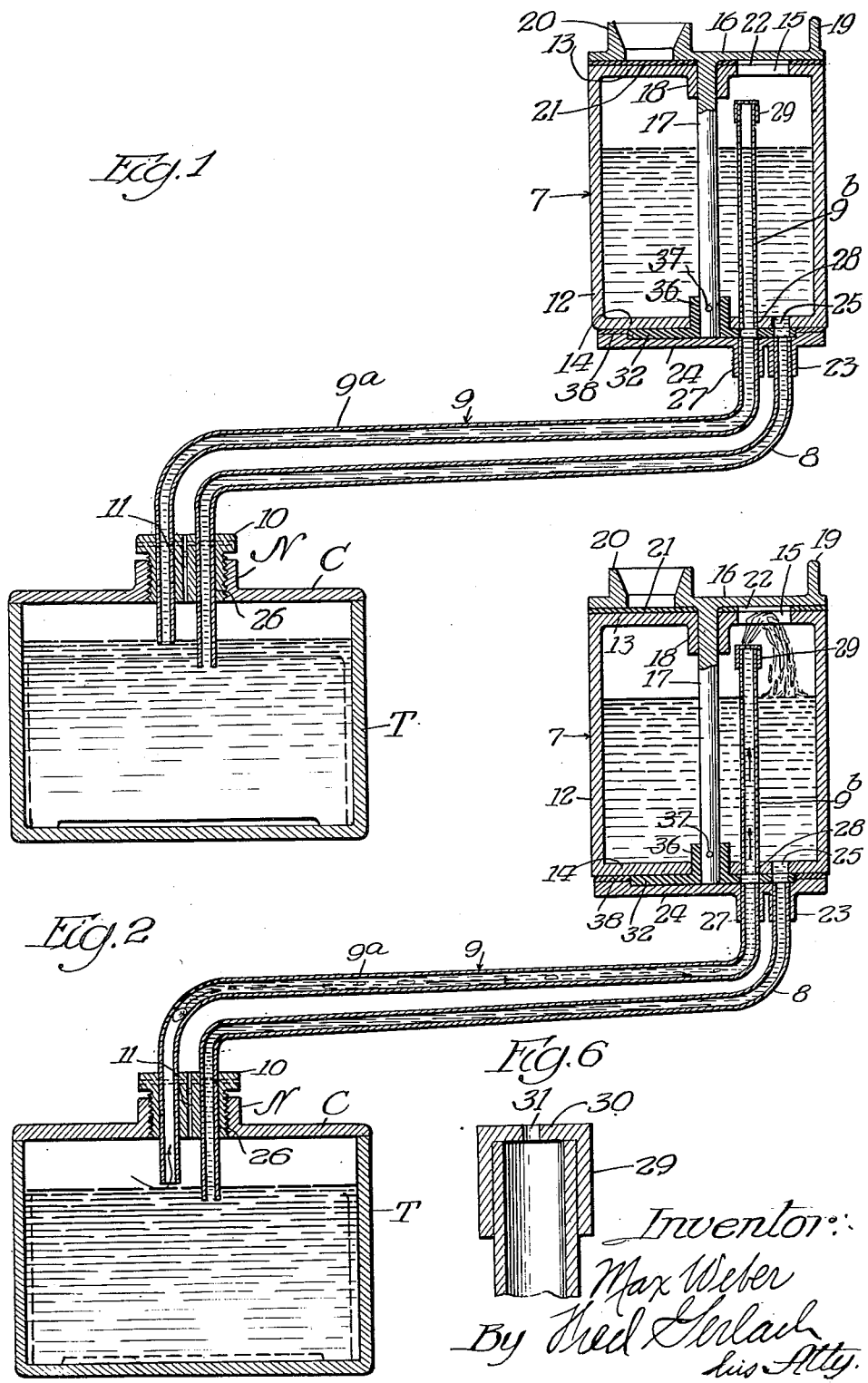

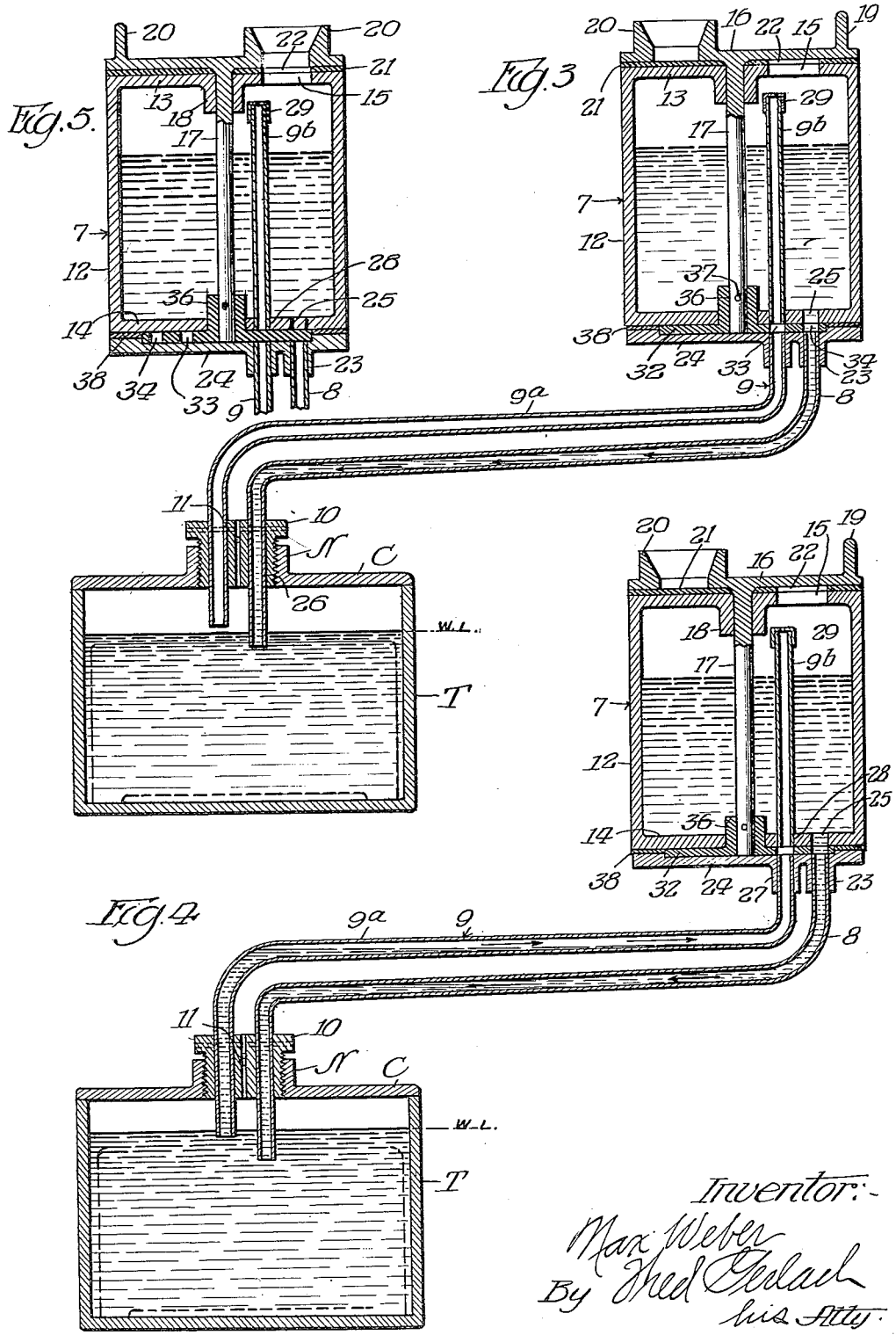

Patented Sept. 11, 1934

1,972,962

UNITED STATES PATENT OFFICE 1,972,962

CONSTANT LEVEL APPARATUS

Max Weber, Chicago, Ill.

Application May 8, 1933, Serial No. 669,994

2 Claims. (Cl. 137—68)

The present invention relates generally to apparatus for maintaining liquid at a constant level in a tank or other receptacle. More particularly, the invention relates to that type of constant level apparatus which has general application and comprises (1) an air-tight reservoir which is located above the tank and contains a supply of liquid for feed or supply to the tank; (2) a feed pipe which extends between the bottom of the reservoir and a point in the tank beneath the desired liquid level and serves to feed the liquid in the reservoir to the tank when the reservoir is vented, that is, when air is introduced into the reservoir; and (3) a vent pipe which leads from the desired level point in the tank to the top of the reservoir and operates when the liquid in the tank drops below its proper level and exposes to atmosphere the tank end of the vent pipe, to introduce air into the reservoir.

The primary object of the invention is to provide a constant level apparatus of the aforementioned type which is an improvement upon previously designed apparatus of the same general character, by reason of the fact that it embodies simple and novel means whereby, when the liquid in the tank drops below the proper or predetermined level, it is prevented from locking, that is, remaining in a state of equilibrium wherein the column of liquid which, during the previous cycle of operation of the apparatus, is sucked or drawn into the vent pipe by the action of the liquid in the feed pipe when the liquid in the tank rises to the proper level and seals or closes the tank end of the vent pipe, balances the column of liquid in the feed pipe and the pressure of the air surrounding the lower or air-exposed end of the vent pipe together with the suction in the reservoir is insufficient to force the entire column of liquid in the vent pipe up into the reservoir so as to free the vent pipe and thus release the liquid in the reservoir for flow via the feed pipe to the tank. In general, this means comprises a cap which is applied to the upper or reservoir end of the vent pipe, and embodies a minute aperture which, when the liquid in the tank drops below the proper level and exposes to atmosphere the lower end of the vent pipe, causes the column of liquid in the vent pipe to flow upwards in a fine stream into the reservoir and serves to reduce the force or pressure that is necessary to start upward flow of the column of liquid in the vent pipe. As soon as a portion of the column of liquid in the vent pipe flows upwardly into the reservoir the balanced relation of the column of liquid in the two pipes becomes broken and the column of liquid in the feed pipe flows downwardly into the tank and, by the suction which it creates in the reservoir, serves to assist the air pressure to elevate the remainder of the column of liquid from the vent pipe.

A further object of the invention is to provide a constant level apparatus which is generally of new and improved construction and is positive in operation in that it operates to maintain a constant level of the liquid in the tank as long as the reservoir is charged with a supply of the liquid.

Other objects of the invention and the various advantages and characteristics of the present constant level apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a sectional view of a constant level apparatus embodying the invention, showing the vent pipe after the tank end thereof has been closed by the liquid in the tank and after it is filled with liquid by the action of the liquid in the feed pipe;

Figure 2 is a sectional view of the apparatus showing the liquid in the vent pipe being discharged into the reservoir in response to the action of the liquid in the feed pipe upon exposure of the tank end of the vent pipe to atmosphere;

Figure 3 is a sectional view of the apparatus showing the vent pipe after discharge of the liquid therefrom and operating to vent the reservoir so as to permit of unrestricted feed of liquid into the tank via the feed pipe;

Figure 4 is a sectional view of the apparatus showing the liquid being drawn into the vent pipe after the liquid in the tank rises to a point wherein it closes the tank end of the vent pipe;

Figure 5 is a sectional view of the reservoir; and

Figure 6 is an enlarged section of the cap which forms the restriction at the reservoir end of the vent pipe.

The apparatus which forms the subject matter of the present invention is adapted to maintain liquid at a constant level in a tank T and comprises a reservoir 7, a feed pipe 8 and a vent pipe 9. It has more or less general application. For example, the apparatus may be used to maintain the electrolyte in a storage battery at a constant level by supplying or feeding distilled water to the battery, or it may be used to feed oil into, and to maintain a constant oil level in, the crank case of a motor. The tank T is shown in the drawings as being partly filled with a liquid and may represent the casing of a storage battery, the crank case of a motor or any other receptacle wherein it is desired to maintain liquid at a constant level. The top of the tank is closed by a removable cover C which embodies at the central portion thereof an inlet nipple N. This nipple is internally threaded and is closed by a screw plug 10. The latter embodies a vertically extending vent passage 11 whereby the interior of the tank is open to atmosphere.

The reservoir 7 is located above the tank T and contains a supply of liquid for feed to the tank T via the feed pipe 8. It is air-tight and consists of a cylindrical side wall 12, a top 13 and a bottom 14. The top 13 is provided with an opening 15 whereby the reservoir may be filled whenever necessary. This opening is normally closed by a disk 16 which overlies the top 13 and embodies a stem 17 whereby it is rotatably supported. The stem 17, as shown in the drawings, is formed integrally with and depends from the central portion of the disk 16 and extends through the reservoir. The upper end of the stem is journalled in a bearing 18 which is formed integrally with the top 13 of the receptacle. The disk 16 is provided with a handle 19 at one side thereof and embodies at a point substantially diametrically opposite to the handle an inlet member 20. The latter is adapted upon rotation of the disk to be brought into registry with the opening 15 so as to permit of filling of the reservoir. When the member 20 is rotated out of registry with the opening 15, the latter is closed and the receptacle thus becomes air-tight. A gasket 21 is interposed between the bottom face of the disk 16 and the top face of the top 13 so as to prevent leakage between the disk and the reservoir top. This gasket is apertured for reception of the stem 17 and embodies a circular opening 22 above and in registry with the opening 15.

The feed pipe 8 extends between the reservoir 7 and the tank T and operates, as hereinafter described, to feed liquid from the reservoir to the tank when the level of the liquid in the tank drops beneath a predetermined level. The reservoir end of the pipe 8 extends through an apertured boss 23 on a circular plate 24 under the bottom 12 of the reservoir and communicates with the interior of the reservoir by way of an opening 25 in the reservoir bottom. The tank end of the feed pipe 8 extends through an opening 26 in the screw cap 10 and terminates within the interior of the tank T at a point beneath the desired liquid level so that it is always covered by the liquid in the tank and hence is not exposed or open to atmosphere. When the reservoir 7 is vented by the introduction of air into the reservoir, the liquid in the receptacle flows through the feed pipe 8 into the tank T. As soon as the flow of air to the reservoir is stopped, feed of the liquid from the reservoir to the tank is cut off.

The vent pipe 9 is of the same internal diameter as the feed pipe 8. It leads from the interior of the tank T to the top of the reservoir 7 and consists of a section 9ª and a section 9ᵇ. The section 9ª is positioned so that it is substantially parallel to the feed pipe 8. One end of this section extends through the screw cap 10 and into the top of the tank T, and terminates at the level at which it is desired to maintain the liquid. The other end of the pipe section 9ª extends through an apertured boss 27 on the circular plate 24 beneath the reservoir bottom 14. The pipe section 9ᵇ extends vertically in the reservoir 7 and is positioned alongside of the depending stem. The lower end of the vent pipe section 9ᵇ extends through an aperture 28 in the reservoir bottom 14 and is aligned with the end of the pipe section 9ª which extends through the apertured boss 27. When the level of the liquid in the tank T is at the desired or proper level, the tank end of the vent pipe 9 is closed or sealed by the liquid and hence the liquid in the reservoir 7 is locked against feed to the tank. As soon as the level of the liquid in the tank T drops so that the tank end of the vent pipe is exposed, air flows through the vent pipe into the reservoir with the result that the liquid in the reservoir feeds into the tank T via the feed pipe until the liquid in the tank T reaches the proper level and closes the tank end of the vent pipe. Upon closing or sealing of the tank end of the vent pipe, liquid in the tank is drawn into the vent pipe until it reaches the level of the liquid in the reservoir 7. This is due to the fact that the air in the vent pipe permits of a limited flow of the liquid in the reservoir to the tank T after closing of the tank end of the vent pipe, and the suction in the reservoir created by this limited flow causes liquid to be drawn up into the vent pipe from the tank T. When the liquid in the tank drops below its predetermined or proper level and exposes the tank end of the vent pipe 9ª, the liquid drawn into the vent pipe from the tank is drawn or forced upwardly into the reservoir 7 in response to the combined action of the vacuum in the reservoir and the pressure of the air around the tank end of the vent pipe.

In practice it has been found that when the vent pipe is of uniform diameter or cross sectional area from one end thereof to the other, the apparatus sometimes locks when the liquid in the tank drops below its proper or predetermined level. This is due to the fact that the column of liquid in the vent pipe 8 balances the column of liquid in the feed pipe 9 and the pressure of the air around the lower or exposed end of the vent pipe, together with the suction in the reservoir, is not sufficient to start upward flow of the column of liquid in the vent pipe. When this condition arises the apparatus is in a condition of so-called equilibrium and will not operate to supply liquid from the reservoir to the tank in order to maintain the proper liquid level in the tank. In order to prevent locking of the liquid and further to quicken the action of the apparatus, a cap 29 is applied to the reservoir end of the vent pipe. This cap is soldered or otherwise secured to the upper end of the vent pipe section 9ᵇ and embodies a cross wall 30 with a central aperture 31. The latter is materially less in diameter or cross sectional area than the vent feed pipes and as a result, less force is necessary initially to start the upflow of the liquid in the vent pipe into the reservoir when the tank end of the vent pipe is exposed to atmospheric pressure. As soon as a portion of the liquid in the vent pipe is forced upwardly into the reservoir the balanced relation between the columns of liquid in the vent and feed pipes is broken, with the result that the liquid in the feed pipe starts to flow and, by the vacuum which it creates in the resrvoir, assists the pressure of the air around the tank end of the vent pipe by raising or forcing upwardly into the reservoir the liquid in the vent pipe. By limiting the force that is necessary initially to start the up flow of the liquid in the vent pipe when the liquid in the tank drops below the proper level and exposes to atmosphere the tank end of the vent pipe, the pressure of the air around the tank end of the vent pipe, together with the suction in the reservoir, is sufficient to start at all times up flow of the column of liquid in the vent pipe. By virtue of the fact that the aperture 31 in the cross wall of the cap 29 is comparatively small, the liquid in the vent pipe starts to flow upwardly therethrough, as soon as the tank end of the vent pipe is exposed to the pressure of the surrounding air. In practice it has been found that exceptionally good results are obtainable when the vent and feed pipes are one quarter of an inch in diameter and the aperture 31 has a diameter of one sixteenth of an inch.

For the purpose of closing the vent and feed pipes when the reservoir 7 is opened for refill thereof, a disk valve 32 is interposed between the circular plate 24 and the bottom 14 of the reservoir. This valve embodies a pair of ports 33 and 34 and is connected to the lower end of the stem 17 so that it is rotatable with the disk 16. A sleeve 35 on the central portion of the disk valve extends upwardly through a circular hole 36 in the center of the bottom 12 of the reservoir and receives the lower ends of the stem 17. A pin 37 extends through the stem and sleeve so as to effect connection of the stem and the disk valve. The port 33 is arranged so that when the disk valve is in its normal or opened position, it registers with the upper end of the pipe section 9ª of the vent pipe and the lower end of the pipe section 9ᵇ. When the plate 16 is rotated so as to bring the nipple 20 into registry with the opening 15, the disk valve 32 is turned so as to close the vent and feed pipes. A circular gasket 38 surrounds the disk valve and is interposed between the bottom of the reservoir and the margin of the plate 24 and serves to prevent leakage of the liquid from the reservoir.

The operation of the apparatus is as follows:

When the liquid in the tank T is at its proper level, the tank end of the vent pipe 9 is immersed in the liquid and is thus closed to atmosphere, and there is a column of liquid in the vent pipe as shown in Figure 1 of the drawings. When the liquid in the tank T drops below its proper or predetermined level, the tank end of the vent pipe becomes exposed to atmosphere. As soon as this happens, the liquid in the vent pipe is forced upwardly, as shown in Figure 2 of the drawings, and flows into the reservoir 7 in response to the suction in the reservoir and the pressure of the air in the tank end of the vent pipe. Upon discharge of the liquid from the vent pipe into the reservoir, communication is established between the reservoir and atmosphere with the result that the liquid in the reservoir feeds to the tank, as shown in Figure 3 of the drawings. When the liquid in the tank rises to its proper or predetermined level, it closes or seals the tank end of the vent pipe and thus automatically cuts off further feed of the liquid from the reservoir 7. As soon as the tank end of the vent pipe is sealed or closed as the result of the liquid in the tank being raised to its proper level, liquid is drawn up into the vent pipe as indicated in Figure 4 of the drawings and as previously described. The action of the apparatus is continuous and automatic with the result that the liquid in the tank is retained at a constant or predetermined level as long as there is any liquid in the reservoir 7. When it is desired to refill the reservoir 7, the disk 16 is rotated so as to bring the nipple 20 into registry with the opening 15. When the openings 15 and 20 are in registry, liquid may be poured into the reservoir. When the disk 16 is turned so as to open the reservoir for refilling, the disk valve 32 is turned into its closed position wherein the ports 33 and 34 are respectively out of registry with the upper end of the feed pipe 8 and the upper end of the pipe section 9ª of the vent pipe, and the feed and vent pipes are closed against the flow of liquid therethrough.

The herein described apparatus is exceedingly simple as far as construction is concerned, and may be produced at a low and reasonable cost. It is efficient and positive in action due to the fact that the comparatively small aperture 31 in the cross wall of the cap 29 forms a restriction whereby upward flow of the liquid in the vent pipe is assured upon opening of the tank end of the vent pipe 9 to atmosphere.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. An apparatus for maintaining a liquid at a constant level in a tank, comprising in combination an air-tight reservoir positioned above the tank and containing a supply of the liquid; a feed pipe extending between the bottom of the reservoir and a point in the tank beneath the level at which the liquid is to be maintained and serving when the reservoir is vented to feed the liquid from the reservoir to the tank; a vent pipe having one end thereof extending into the tank and terminating at the aforesaid level and its other end leading to the top of the reservoir, and adapted when the liquid in the tank reaches its proper level and closes to atmosphere said one end of the vent pipe to have a portion of the liquid in the tank drawn into it by the suction in the reservoir resulting from flow of the liquid through the feed pipe to the tank and when the liquid in the tank drops below its proper level and exposes to atmosphere said one end of the vent pipe to have the liquid therein forced upwardly into the reservoir by the pressure of the air surrounding said one end of the vent pipe and the vacuum in the reservoir in order to free the vent pipe for liquid releasing purposes; and means associated with said other end of the vent pipe and forming a minute discharge aperture whereby the force necessary to start up flow of the liquid in the vent pipe upon exposure of said one end of the vent pipe to atmosphere is reduced to a point where locking of the liquid in the vent pipe is precluded.

2. An apparatus for maintaining a liquid at a constant level in a tank, comprising in combination an air-tight reservoir positioned above the tank and containing a supply of the liquid; a feed pipe of substantially uniform internal diameter from end to end extending between the bottom of the reservoir and a point in the tank beneath the level at which the liquid is to be maintained and serving when the reservoir is vented to feed the liquid from the reservoir to the tank; a vent pipe of substantially uniform internal diameter from end to end and the same diameter as the feed pipe having one end thereof extending into the tank and terminating at the aforesaid level and its other end leading to the top of the reservoir, and adapted when the liquid in the tank reaches its proper level and closes to atmosphere said one end of the vent pipe to have a portion of the liquid in the tank drawn into it by the suction in the reservoir resulting from flow of the liquid through the feed pipe to the tank and when the liquid in the tank drops below its proper level and exposes to atmosphere said one end of the vent pipe to have the liquid therein forced upwardly into the reservoir by the pressure of the air surrounding said one end of the vent pipe and the vacuum in the reservoir in order to free the vent pipe for liquid releasing purposes; and a cap mounted on said other end of the vent pipe and having in the top thereof a minute discharge aperture of materially less diameter or cross-sectional area than the feed or vent pipe whereby the force necessary to start up flow of the liquid in the vent pipe upon exposure of said one end of the vent pipe to atmosphere is reduced to a point where locking of the liquid in the vent pipe is precluded.

MAX WEBER.